United States Patent [19]
Frische et al.

[11] Patent Number: 5,498,706
[45] Date of Patent: Mar. 12, 1996

[54] WATER-RESISTANT STARCH MATERIALS FOR THE PRODUCTION OF CAST SHEETS AND THERMOPLASTIC MATERIALS

[75] Inventors: Rainer Frische, Frankfurt am Main; Renate Gross-Lannert, Dietzenbach; Klaus Wollmann, Eschenhofen; Bernd Best, Moerfelden, all of Germany; Eduard Schmid, Bonaduz; Fritz Buehler, Thusis, both of Switzerland

[73] Assignee: EMS Inventa AG, Zurich, Switzerland

[21] Appl. No.: 302,012

[22] Filed: Sep. 9, 1994

Related U.S. Application Data

[62] Division of Ser. No. 958,103, Mar. 1, 1993, Pat. No. 5,367,067.

[30] Foreign Application Priority Data

Apr. 30, 1992 [DE] Germany ............... 41 14 185.7

[51] Int. Cl.⁶ ............... C08L 3/06; C08K 5/10; C08J 5/18
[52] U.S. Cl. ............... 536/45; 536/48; 536/102; 536/111; 536/124; 536/127
[58] Field of Search ............... 536/45, 48, 102, 536/111, 124, 127

[56] References Cited

U.S. PATENT DOCUMENTS

| | | | |
|---|---|---|---|
| 1,928,269 | 7/1930 | Schmidt et al. | 536/107 |
| 2,451,686 | 3/1946 | Möller et al. | 536/107 |
| 2,589,226 | 11/1946 | Carson | 536/107 |
| 3,271,387 | 9/1966 | Patel et al. | 536/107 |
| 3,878,196 | 4/1975 | Glasscock et al. | 536/107 |
| 4,501,888 | 2/1985 | Schmidt | 536/107 |
| 4,720,544 | 1/1988 | Schouten | 536/107 |
| 4,837,314 | 6/1989 | Eastman | 536/107 |
| 4,959,466 | 9/1990 | White | 536/107 |
| 5,032,683 | 7/1991 | Dragner et al. | 536/107 |
| 5,068,321 | 11/1991 | Buysch et al. | 536/107 |

*Primary Examiner*—Nathan M. Nutter
*Attorney, Agent, or Firm*—Beveridge, DeGrandi, Weilacher & Young

[57] ABSTRACT

The present invention relates to water-resistant, thermoplastic starch materials processable into environmentally safe, thermoplastically produced products and cast sheets, which consist of starch acyl compounds, obtainable from high amylose starches and the derivatives thereof and being sparingly soluble in water, and of plasticizers which like ethyl citrate, glycerol acetate and lactic acid ester have a gelatinizing effect and preferably a dissolution property resulting in brilliant transparence and, as can be proved, are biodegradable.

14 Claims, No Drawings

WATER-RESISTANT STARCH MATERIALS FOR THE PRODUCTION OF CAST SHEETS AND THERMOPLASTIC MATERIALS

This is a divisional of application Ser. No. 07/958,103 filed on Mar. 1, 1993, now U.S. Pat. No. 5,367,067

BACKGROUND OF THE INVENTION

1. Field of Invention

The present invention relates to water-resistant starch materials which are thermoplastic and can be processed into environmentally safe products, particularly moldings and thermoplastically produced sheets as well as cast sheets.

2. Description of the Prior Art

Starch esters, particularly acetates, have been known for a long period of time. A distinction is made between highly substituted starch acetates having a degree of substitution (DS) of 2–3 and low-substituted starch acetates having a DS up to a maximum of 1. Whereas highly substituted starch acetates have not yet gained any technical importance, low-substituted starch acetates are well-established commercial products.

Known acetates having a high degree of substitution (DS 2.5–3) are cellulose and amylose triacetates. According to literature the properties of films consisting of amylose triacetate are similar to those made of cellulose triacetate. The films were made of chloroform.

It is also generally known and described in numerous citations to produce starch acetates according to methods and processes common practice in the chemical industry, e.g. by using acetic anhydride, acetic anhydride pyridine, mixtures consisting of acetic anhydride and glacial acetic acid, ketene, vinyl acetate, and acetic acid, potato starch and corn starch being the predominantly used starches.

Relatively long reaction times and drastic reaction conditions had to be accepted to obtain highly substituted derivatives.

The strong decomposition of the starch molecules to give relatively short chains which do no longer have the film-forming properties typical of starch are especially disadvantageous in connection with these processes.

Little has been described about the production of high amylose starch acetate having a high degree of substitution. A regulation by Mark and Mehltretter is found in U.S. Pat. No. 3,795,670 and in the corresponding publication "Facile Preparation of Starch Triacetates" in the journal Stärke, No. 3, pages 73–100, 1972. A purchasable high amylose corn starch from National Starch, which had an amylose content of about 70%, was used as the starch. The aspired complete acetylization was obtained by well-calculated selection of the catalyst and variation of its amount and a reaction time of about 5 hours by avoiding the above conventional processes and substance components used therein. The acetate obtained after 5 hours and having a degree of substitution of 3 could be cast together with dichloromethane solution into transparent flexible sheets. Although no other high amylose starches were used, it was assumed that, with equal course and results, the indicated process would generally be usable for high amylose starches and the obtained starch triacetates could furthermore be converted into fibers.

However, as expected the triacetates obtained by this process as well as sheets produced therefrom are not fully biodegradable or compostable within acceptable periods of time. Advantages over cellulose acetates have not been observed with respect to this point.

SUMMARY OF THE INVENTION

The object of this invention is to provide starch materials which distinguish themselves by a high technical value, cannot only be processed into cast sheets but also thermoplastically into any moldings and sheets which are environmentally safe and, when exposed to environmental forces, can be decomposed completely to give substances occurring in nature in any case. When placed in the environment, these materials do not lead to any lasting environmental hazard.

This problem is solved by a water-resistant, thermoplastic starch material processable into environmentally safe, thermoplastically produced products and cast sheets, which is characterized in that it consists of at least one starch acyl compound, sparingly soluble in water and made of amylose-rich starches and the derivatives thereof, and of at least one plasticizer effecting gelation and being biodegradable.

The invention further provides a process for the production of starch material as outlined above, which is characterized in that the acyl components, particularly the long-chain fatty acids, are simultaneously or successively reacted with the starch in a one-pot reaction without isolation of the intermediate products. There is also provided a process for the production of starch material as described above, which is characterized in that the acyl components, particularly the long-chain fatty acids, are simultaneously or successively reacted with the starch in a one-pot process without isolation of the intermediate products and then the starch acyl compound is obtained from the reaction product by means of solution fractionation. Another alternative relates to a process for the production of thermoplastic sheets and moldings by extrusion or injection molding in known manner from starch material as outlined above, wherein the plasticizer(s) of the starch acyl compound are preferably not added until the material is fed to the processing means. One embodiment concerns a process for the production of cast sheets in known manner from starch material as described above, which is characterized in that ethyl acetate, ethyl lactate, n-butyl acetate, chloroform, methylene chloride, acetone, ethyl acetoacetate, acetylacetone and the mixtures thereof are used as the solvent.

A further subject matter relates to the use of the above-described starch material for the production of thermoplastic sheets and moldings by extrusion, injection molding and calendering. Finally, this invention concerns the use of starch material as outlined above for the production of cast sheets.

DESCRIPTION OF THE PREFERRED EMBODIMENT

The inventors have found that, in order to be able to produce transparent and flexible cast sheets, the former demand for complete acetate formation and thus a necessary starch acetate substitution degree of 3 could be dropped when using plasticizers and special corn starches as well as meanwhile cultivated high amylose corn and pea starches, even though the latter do not differ from the corn starch type used in the above process according to U.S. Pat. No. 3,795,670 as regards their amylose content.

It is also astonishing that when such starches which comprise preferably 70% of amylose and 30% of amylopectin are used, uniform, thermoplastically processable materials as result from the corresponding amylose products can be obtained at all.

In the direct acetate formation of high amylose corn starch, i.e. without subsequent DS adjustment as necessary in the case of cellulose acetates, it is possible to produce products which do not only form clear solutions in organic solvents from which clear, transparent sheets can be made but also supply clear materials when processed thermoplastically.

When the degree of substitution of the acetates which are obtained from the employed corn starches and have these properties was determined, values around 2.5 and down to 2.2 were established which are thus markedly below a DS value of 3. This is all the more surprising because these values are markedly lower than those of the pure amylose and cellulose acetates, it having been assumed according to the state of knowledge that these values are absolutely necessary for the sheet production and quality. Corresponding to the cited process the person skilled in the art formerly also assumed that acetate derivatives having a degree of substitution of less than 3 and obtained by direct acetate formation without new saponification do not form clear solutions as is also the case for many cellulose acetates. When the plasticizers according to the invention are used it is possible to directly produce the desired products from the material corn starch acetate plus plasticizer with such low DS values.

According to the invention it has been found surprisingly and contrary to the assumptions made in the cited process that when another high amylose starch such as a high amylose pea starch is used, a high amylose pea starch acetate having properties markedly differing from those of the corn starch is obtained with equal reaction conditions.

In this connection, the high amylose pea starch proved to be a much more favorable raw material. Substitution degrees around 2.5 are obtained after a reaction time of only 2 hours, which together with the plasticizer properties result in a material of the aspired kind. In this way, the substitution degree can be reduced even to below 2.5 without the properties of the resulting materials deteriorating. By means of prolonged reaction times it is possible to increase the DS value up to 3 and correspondingly reduce the plasticizer addition if desired owing to certain demands made as to the end products.

Effects were obtained by the plasticizer addition which could by no means be foreseen. For example, the brittleness of the starch acetates is reduced by the property of the plasticizer(s) effecting reversible gelation, without lastingly influencing or lowering the strength thereof as is usually the case. Thus, only the substances mentioned have been established as plasticizers by now. The plasticizers in consideration are starch acetate-dissolving liquids having preferably low vapor pressure, which have the necessary gelation capacity and/or a low strength-reducing effect as well as preferably a dissolving property resulting in brilliant transparence and, as can be proved, are at the same time fully biodegradable.

The following is stated on the above-mentioned reversible gelation. With increasing addition, the plasticizers according to the invention in combination with the solid starch acetates lead, in the case of mechanical thorough mixing (kneading, shaking, stirring), initially to a strong swelling of the solid starch acetates, then to extremely tough, sticky compositions and finally to transparent viscous quasi-solutions which form gels when allowed to stand. These gels are again converted into quasi-homogeneous solutions by renewed mechanical and optional additional heating. This applies to mixtures of starch acetate plus plasticizer(s) as well as the addition of suitable, highly volatile solvents for the cast sheet production. It has been found that the temporal stability of the solutions is sufficient for the aspired processes. For example, even those solutions can be drawn out homogeneously as films at room temperature, which when allowed to stand at room temperature would form gels that are no longer castable and capable of being drawn-out homogeneously. The drawn-out solution films dry to form brilliantly transparent sheets, the gel formation being also decisive for the brilliance of the sheets.

The required low vapor pressure is, of course, not based on the vapor pressure of the individual components but corresponds to the effective vapor pressure of the mixture.

In addition, it has been found that, e.g. by means of the ethyl esters of citric acid, lactic acid and the glycerol acetates as well as the phosphoric esters employed as plasticizers, compositions completely decomposable in all can be produced which could be processed into clear moldings by means of machines common in plastics processing, such as extruders, calenders and injection molding machines.

A biodegradation test carried out in compost earth with both the derivative per se and the sheets and moldings produced therefrom resulted in a rapid attack and decay of the material, so that compostability can be assumed. In this connection, the plasticizers added for processing proved to be of decisive importance for creating attacking components and decay-promoting conditions which determine the degradation behavior.

It is also possible to produce clear, transparent and very flexible, fully biodegradable sheets from organic solvents such as ethyl acetate. It is preferred to use 5 to 20% solutions, based on the sum of plasticizer and starch acetate, the ratio of plasticizer to starch acetate preferably ranging from 0.5 to 50%. The mixtures without additional solvent can surprisingly be calendered with success to give brilliantly transparent sheets, with temperatures far below the extrusion temperatures being astonishingly sufficient. Calendering and extruding and thus also injection molding are therefore possible by means of plasticizer and starch acetate alone.

According to the invention novel starch materials and products having different properties are obtained by minor additions of relatively long-chain fatty acids, such as palmitic acid or stearic acid in the form of the free acids and/or as fatty acid chlorides during the acetate formation by means of the starch fat acyl compound such as the acetic anhydride or the corresponding mixed anhydrides. For example, sheets and moldings can be made from these derivatives, which as compared to those made from pure high amylose corn starch acetates and pure high amylose pea starch acetates have a markedly greater flexibility, dimensional stability, pliability and wear resistance.

Along with the advantage resulting from the further improvement of the starch acetate/plasticizer material by introducing the relatively long-chain fatty acids, particularly the natural fatty acids (having 12–22 carbon atoms or the derivatives thereof), there is also the process advantage that this does not render the simple production of the material more labor intensive, time-consuming or costly, since although it had to be assumed initially that the introduction of the fatty acids into the reaction product would not be readily possible, a one-pot reaction is also possible in the case of this especially advantageous modification of the material (claim 10).

By the solution fractionation of the starch acyl compounds it is also possible to produce in a well-calculated manner compositions having differing properties which can be processed e.g. thermoplastically into sheets and moldings.

In addition to said starches, particularly those having an amylose content of over 70%, the derivatives thereof such as hydroxypropyl and hydroxyethyl starches having a low DS value of 0.1 to 0.2 are also usable for the material according to the invention as a raw acetate formation material.

The below examples elucidate the simple producibility of the materials according to the invention as well as their excellent suitability as starting materials for cast sheets and thermoplastic moldings having unlimited biodegradability. Solvents which are used preferably for the cast sheet production are defined in claim 13.

EXAMPLE 1

Production of high amylose corn acetate 460 g of Hylon VII are supplied to a 10 liter four-neck flask having a reflux condenser, dropping funnel and thermometer and admixed under stirring with 1500 ml of acetic anhydride. After about 5 minutes of thorough mixing, 88 g of 50% NaOH are added dropwise. Then, the mixture is heated until constant reflux occurs. The boiling temperature is about 125° C. In this connection, overheating which may lead to burning of the starch to the flask rim is to be avoided.

After 1 to 2 hours the viscosity increases until a tough, brownish clear composition has formed after 3 to 4 hours. After period of about 5 hours, i.e. the required reaction time, 50 to 100 ml of acetic acid are distilled off at 118° C. and thereafter 200 ml of ethanol are added dropwise. Then, stirring takes place for another 30 minutes with slightly reduced heating and thereafter about 100 ml of the resulting solvent mixture consisting of acetic ester and acetic acid forming when ethanol is reacted with acetic anhydride are distilled off at 102° to 105° C. Then, heating is discontinued and the composition is allowed to cool down for 0.5 to 1 hour. Following this, 200 ml of ethanol are added dropwise again. Thereafter, precipitation is carried out slowly with about 2 liters of methanol. The product is washed several times with alcohol, withdrawn and dried in air. For further processing, the product is finely ground and screened.

The yield was repeatedly from 670 to 680 g. The determined DS value was around 2.7 (2.5–2.9). The desired materials for cast sheets and thermoplastic moldings can be provided by adding plasticizers of said kind before or after the further processing.

The process, in connection with which relatively large amounts have already been used in laboratory tests, can readily be applied to normal outputs within the kilogram range by distilling off the solvent mixture prior to the precipitation by means of alcohol.

EXAMPLE 2

Production of pea starch acetate As in Example 1, 150 g of pea starch are suspended in 600 g of acetic anhydride, and 33 g of 50% sodium hydroxide solution is slowly added dropwise. The reaction time required until a starch acetate, well usable for the material and having a DS value of 1.86, has been obtained is only 0.5 hour.

A well usable starch acetate having a DS value of 2.61 is obtained after 2 hours.

For example, a cast sheet obtained by using 30% of ethyl citrate (Citroflex 2) as the plasticizer is transparent and pliable.

EXAMPLE 3

Starch acetate material on the basis of Hylon VII with palmitic acid chloride and glycerol acetate 23 g of Hylon VII are supplied to a four-neck flask and admixed under stirring with 80 g of acetic anhydride. Then, 4.4 g of 50% NaOH solution are added dropwise. After a reaction time of 2 hours, 3.44 g of palmitic acid chloride are slowly added dropwise and the mixture is stirred for another 3 hours. Isolation is carried out as described in Example 1. The determined DS value is around 2.5.

7 g of this starch acetate were stirred up with 3 g of glycerol acetate and pressed at 180° C. 2 minutes without pressure and 2 minutes with pressure (5 tons) to give a clear, elastic sheet. This sheet could be deep-drawn.

EXAMPLE 4

Starch acetate material on the basis of Hylon VII with palmitic acid and glycerol acetate 23 g of Hylon VII are supplied to a four-neck flask and admixed under stirring with 80 g of acetic anhydride and 8 g of palmitic acid. After a reaction time of 5 hours the product is isolated as described in Example 1. The DS value is around 2.5.

7 g of this starch acetate were stirred up with 3 g of glycerol acetate and pressed at 180° C. 2 minutes without pressure and 2 minutes with pressure (5 tons) to give a clear, elastic sheet. This sheet could be deep-drawn.

On the one hand, Examples 3 and 4 show that the substitution of acetate portions by the fatty acid is not restricted to certain portions. On the other hand, it becomes evident that in the respective one-pot reaction the fatty acid component can be used both from the very beginning and later.

Numerous other relatively long-chain fatty acids such as $C_6$–$C_{24}$, saturated, monounsaturated and polyunsaturated, as occurring in natural oils and fats, are usable in place of palmitic acid and the chloride thereof, respectively.

EXAMPLE 5

Production of a cast sheet 80 g of solvent mixture consisting of 80% by volume of acetone and 20% by volume of ethyl lactate are supplied to a 250 ml two-neck flask having a reflux condenser. 6 g of ethyl citrate or 6 g of glycerol acetate are added thereto and the mixture is stirred thoroughly. Then, 14 g of starch acetate, produced e.g. according to one of the preceding examples, are weighed and added, and the mixture is heated under vigorous stirring to about 80° C. When dissolution is completed after 15 minutes up to about 1 hour, pressure filtration may be used for purification. Thereafter, the product is supplied onto a glass plate by means of a coating knife in a thickness of about 700 μm. The dried sheet has a thickness of about 50 μm and is freely suspended after drying for the purpose of homogenization for about 2 hours.

Acetic ester can also be used instead of the solvent mixture, and in the laboratory it is also possible to use chloroform. Sheets obtained in this way exhibit an even better brilliance. Additions of triphenylphosphate, triallylphosphate, tricresylphosphate, ethyl acetoacetate and acetylacetone have a positive effect on the material properties of the resulting sheets.

When a solvent mixture consisting of 70% by volume of acetone, 20% by volume of ethyl lactate and 10% by volume of butylacetate is used, sheets having a leathery surface structure are obtained.

EXAMPLE 6

Production of a pressed sheet 7 g of starch acetate are stirred up intensely with 3 g of ethyl citrate and then pressed on a thermopress between two teflon disks at 200° C. initially for 2 minutes without pressure and then 2 minutes with a pressure of 5 tons. The sheets produced can be deep-drawn.

EXAMPLE 7

Processing of the material in an extruder The compatible plasticizer, e.g. ethyl citrate, is not premixed with the starch acetate, e.g. according to the above examples, but directly supplied in doses to the extruder during processing. The temperature of the extruder was adjusted as follows: Zone I cold, Zones II and III 150° C., Zones IV and V 100° C., and Zone VI 150° C. The composition temperature was 149° C., and with a speed of 151 rpm the pressure was 10 bar. The nozzle diameter was 3 mm.

The material could be processed well. It was possible to cool the extruded strand in a water bath. Cutting it into pellets did not pose any problems.

Modifications of the processing pressure e.g. by nozzle diameter variations showed that the machine adjustments are widely variable, so that the person skilled in the art can determine the optimum operating parameters for the special material composition consisting of starch acetate and plasticizer depending on the amounts used in each case.

The above examples only describe a small portion of the total number of usable substances and their quantity ratios. For example, NaOH was always used as the catalyst. However, it has to be assumed that another alkaline solution can be employed as well. The DS value depends on the reaction time and also on the solution fractionation. Although not necesssary for the material, this value can also be raised to over 2.7 in the case of pea starch if this is favorable to the products to be manufactured (less plasticizer). Nevertheless, these few examples already show that the very full acetate formation is no longer necessary. In particular, the time required for the production of the starch acetate component of the material can be reduced and simplified advantageously. Furthermore, the DS value is also influenced by the substitution of fatty acyl component portions by relatively long-chain fatty acids. It is thus possible to further lower the DS value without deteriorating the quality of the product.

Further examples of calendering the material according to the invention are described below.

EXAMPLE 8

35 g of starch acetate
15 g of ethyl citrate
are thoroughly mixed and processed into sheets in a rolling mill adjusted to 105° C. or calender.

EXAMPLE 9

35 g of starch acetate
15 g of glycerol triacetate
are thoroughly mixed and processed into sheets in a rolling mill (100° C.) or calender.

EXAMPLE 10

35 g of starch acetate
15 g of glycerol triacetate
1.5 g of adipic acid dimethyl ester
are thoroughly mixed and processed into sheets in a rolling mill (105° C.) or calender.

EXAMPLE 11

35 g of starch acetate
10 g of glycerol triacetate
5 g of benzyl butyl phthalate
are thoroughly mixed and processed into sheets in a rolling mill (140° C.) or calender.

The starch acetate mentioned is a high amylose corn starch referred to as Hylon VII. As described above, this starch is derivatized to form the corresponding acetate.

The plasticizers indicated in the examples can be mixed with one another in varying combinations, e.g. the combination of benzyl butyl phthalate and ethyl citrate is also possible even though it is not mentioned expressly. The plasticizer amounts may also vary. An amount of up to about 50% of plasticizer can be admixed to the starch acetate. The composition only becomes too soft when this value is exceeded.

We claim:

1. A process for the production of water-resistant, thermoplastic starch material processable into environmentally safe, thermoplastically produced products and cast sheets, said process comprising simultaneously or successively reacting an acylation agent which is a free acid or chloride or anhydride of at least one fatty acid with high amylose starch having an amylose content of greater than or equal to 70% in a one-pot reaction without isolation of the intermediate products and then precipitating the resulting acyl modified starch from the reaction product by adding methanol, wherein the resulting acyl modified starch has a degree of substitution of at least 1.86.

2. A process for the production of water-resistant, thermoplastic starch material processable into environmentally safe, thermoplastically produced products and cast sheets, said process comprising reacting an acylation agent which is a free acid or chloride or anhydride of at least one fatty acid with high amylose starch having an amylose content of greater than or equal to 70% in a one-pot reaction without isolation of the intermediate products and then precipitating the resulting acyl modified starch from the reaction product by adding methanol, wherein the resulting acyl modified starch has a degree of substitution of at least 1.86.

3. The process according to claim 2, wherein the resulting acyl modified starch is based on corn starch and has a degree of substitution of about 2.5.

4. The process according to claim 2, wherein the resulting acyl modified starch is based on pea starch and has a degree of substitution of up to 3.0.

5. The process according to claim 2, wherein the resulting acyl modified starch has a degree of substitution of $\geq 2.0$ and said acylation agent is acetic anhydride.

6. The process according to claim 2, wherein said fatty acid has 12 to 22 carbon atoms.

7. The process according to claim 2, wherein the resulting acyl modified starch is based on pea starch and has a substitution degree of about 2.5.

8. The process according to claim 2, wherein said fatty acid is selected from the group consisting of saturated, monounsaturated and polyunsaturated fatty acids having $C_6$ to $C_{24}$ atoms.

9. The process according to claim 2, wherein the portion of said fatty acid amounts up to 35% by weight based on said high amylose starch.

10. The process according to claim 2, wherein the resulting acyl modified starch is based on corn starch and has a degree of substitution of 2.2 to about 2.5.

11. The process according to claim 2, comprising simultaneously reacting said acylation agent with said high amylose starch.

12. The process according to claim 2, comprising successively reacting an acylation agent which is a free acid or chloride or anhydride of at least one fatty acid with high amylose starch having an amylose content of greater than or equal to 70%.

13. The process according to claim 2, wherein the resulting acyl modified starch is sparingly soluble in water.

14. The process according to claim 2, consisting essentially of reacting an acylation agent which is a free acid or chloride or anhydride of at least one fatty acid with high amylose starch having an amylose content of greater than or equal to 70% in a one-pot reaction without isolation of the intermediate products and then precipitating the resulting acyl modified starch from the reaction product by adding methanol, wherein the resulting acyl modified starch has a degree of substitution of at least 1.86.

\* \* \* \* \*